(12) United States Patent
Kiguchi et al.

(10) Patent No.: US 9,973,133 B2
(45) Date of Patent: *May 15, 2018

(54) MOTOR CONTROL DEVICE AND MOTOR CONTROL METHOD

(71) Applicant: Ricoh Company, Ltd., Tokyo (JP)

(72) Inventors: Hiroyuki Kiguchi, Tokyo (JP); Takeo Seki, Tokyo (JP); Natsuko Ishizuka, Tokyo (JP); Takuya Murata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/272,077

(22) Filed: Sep. 21, 2016

(65) Prior Publication Data

US 2017/0012568 A1     Jan. 12, 2017

Related U.S. Application Data

(63) Continuation of application No. 13/755,353, filed on Jan. 31, 2013, now Pat. No. 9,484,845.

(30) Foreign Application Priority Data

Jan. 31, 2012   (JP) .................................. 2012-018730
Dec. 19, 2012   (JP) .................................. 2012-277471

(51) Int. Cl.
*G05B 19/29*     (2006.01)
*H02P 29/024*     (2016.01)
*H02P 3/00*     (2006.01)

(52) U.S. Cl.
CPC .............. *H02P 29/024* (2013.01); *H02P 3/00* (2013.01); *H02P 29/0241* (2016.02); *G05B 2219/34013* (2013.01)

(58) Field of Classification Search
CPC ... H03M 1/00; H03M 2201/4125; H02P 6/16; H02P 6/003; B65H 9/008; B65H 3/0669; B65H 7/02

(Continued)

(56) References Cited

U.S. PATENT DOCUMENTS 5,809,391 A * 9/1998 Fujita ..................... G03G 15/70
                                                                399/18
6,135,439 A * 10/2000 Ikeda ....................... B65H 7/02
                                                   271/10.03

(Continued)

FOREIGN PATENT DOCUMENTS

JP     62-089489 A    4/1987
JP     62-193585 A    8/1987

(Continued)

*Primary Examiner* — Rina Duda
(74) *Attorney, Agent, or Firm* — Oblon, McClelland, Maier & Neustadt, L.L.P.

(57) ABSTRACT

A motor control device includes a detecting unit configured to detect rotation of a motor to be controlled and output a rotation detection value related to the rotation; a drive control unit configured to perform drive control to rotate the motor at a control target value increasing with time based on the rotation detection value; and an abnormality detection unit configured to perform an abnormality detection process for detecting an abnormality in the drive control based on the rotation detection value and a predetermined threshold. The drive control unit performs control to stop rotation of the motor when the abnormality is detected.

14 Claims, 5 Drawing Sheets

(58) Field of Classification Search
USPC .............. 318/625, 602, 400.4, 685, 696
See application file for complete search history.

(56) References Cited

U.S. PATENT DOCUMENTS

| | | | | |
|---|---|---|---|---|
| 6,984,919 B2 * | 1/2006 | Iino | ............... | H02N 2/0075 |
| | | | | 310/316.01 |
| 7,334,787 B2 * | 2/2008 | Akiyama | ............ | B65H 3/0669 |
| | | | | 271/10.02 |
| 7,498,761 B2 * | 3/2009 | Iwashita | ............... | H02P 29/032 |
| | | | | 318/609 |
| 7,584,951 B2 * | 9/2009 | Otani | ............... | B65H 9/008 |
| | | | | 271/10.01 |
| 7,884,652 B2 * | 2/2011 | Suzuki | ............... | B41J 11/008 |
| | | | | 327/99 |
| 8,072,173 B2 * | 12/2011 | Hamahata | ............ | B25J 9/1674 |
| | | | | 318/400.2 |

FOREIGN PATENT DOCUMENTS

| | | |
|---|---|---|
| JP | 04-261382 | 9/1992 |
| JP | 2691439 | 9/1997 |
| JP | 10-024403 | 1/1998 |
| JP | 2886534 | 2/1999 |
| JP | 2002-062937 | 2/2002 |
| JP | 2009-303427 A | 12/2009 |

* cited by examiner

MOTOR CONTROL DEVICE AND MOTOR CONTROL METHOD

CROSS-REFERENCE TO RELATED APPLICATIONS

The present application is a continuation of U.S. application Ser. No. 13/755,353 filed on Jan. 31, 2013, now issued as U.S. Pat. No. 9,484,845, which claims priority to and incorporates by reference the entire contents of Japanese Patent Application No. 2012-018730 filed in Japan on Jan. 31, 2012 and Japanese Patent Application No. 2012-277471 filed in Japan on Dec. 19, 2012.

BACKGROUND OF THE INVENTION

1. Field of the Invention

The present invention relates to a motor control device, a motor control method, and a computer-readable storage medium.

2. Description of the Related Art

In various types of electric equipment, a position control system or a speed control system, in which a direct-current motor (referred to as a "DC motor" herein after) is used as a driving source, has been conventionally used in an operation unit. For example, in an image formation device such as a printer and an multifunction machine, a control system for feeding back position information and speed information generated from a rotation detection signal (encoder signal) of a motor is used for a drive control of a DC motor used for conveying a paper such as a recording paper and a document to be copied.

As a conventional technique related to the drive control of the above-described DC motor in an image formation device, a technique of Japanese Patent No. 2886534, for example, is known. Japanese Patent No. 2886534 discloses that an abnormality of rotation is detected from an output of an encoder and when an abnormality is detected, a process of turning off a driver of a motor is performed in order to prevent heating or ignition of a motor caused by an abnormality operation, which may occur in a feedback control system for controlling the driving of a servo (DC) motor, from occurring.

However, this type of conventional technique discloses a configuration applicable only for a limited condition that an abnormality detection is performed using an output of an encoder that detects rotation of a motor during phase-locked loop (PLL) control for an operation at a constant speed. Therefore, when a DC motor operates to monotonically increase its rotation speed with time such as an acceleration operation from a stopped state, it is difficult to detect an occurrence of an abnormality which may be a situation that a rotation detection signal is not normally output from an encoder because of a disconnection or a circuit failure, for example. Thus, a breakage of a mechanical system due to its runaway, damage due to motor heating, and the like is unfortunately caused.

Therefore, there is a need to provide a motor control device, a motor control method, and a computer-readable storage medium capable of preventing a damage of a motor driving system due to an abnormality by detecting an abnormality occurring upon a drive control for increasing rotation of a motor with time.

SUMMARY OF THE INVENTION

It is an object of the present invention to at least partially solve the problems in the conventional technology.

According to an embodiment, there is provided a motor control device that includes a detecting unit configured to detect rotation of a motor to be controlled and output a rotation detection value related to the rotation; a drive control unit configured to perform drive control to rotate the motor at a control target value increasing with time based on the rotation detection value; and an abnormality detection unit configured to perform an abnormality detection process for detecting an abnormality in the drive control based on the rotation detection value and a predetermined threshold. The drive control unit performs control to stop rotation of the motor when the abnormality is detected.

According to another embodiment, there is provided a motor control method that includes detecting rotation of a motor to be controlled; outputting a rotation detection value related to the rotation; performing drive control to rotate the motor at a control target value increasing with time based on the rotation detection value; performing an abnormality detection process for detecting an abnormality in the drive control based on the rotation detection value and a predetermined threshold; and performing control to stop rotation of the motor when the abnormality is detected.

According to still another embodiment, there is provided a non-transitory computer-readable storage medium with an executable program stored thereon. The program instructs a computer to perform: detecting rotation of a motor to be controlled; outputting a rotation detection value related to the rotation; performing drive control to rotate the motor at a control target value increasing with time based on the rotation detection value; performing an abnormality detection process for detecting an abnormality in the drive control based on the rotation detection value and a predetermined threshold; and performing control to stop rotation of the motor when the abnormality is detected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

With reference to the accompanying drawings, embodiments according to the present invention will be described in detail below. In the embodiments, a motor control device that uses a direct-current motor (referred to as "DC motor", hereinafter) as a driving source for an operation of conveying a moving body to a predetermined position at a predetermined speed will be described as an example.

More specifically, the motor control device according to the embodiments performs a control of: feeding back a detected speed and a detected position, which can be obtained from a rotation detection signal of an encoder attached to the output shaft of the motor in a state that a load for conveying the moving body is applied to the DC motor, to a controller for controlling the driving of the motor; conveying the moving body at a speed of control target; and positioning the moving body, as an example. Note that the motor control device may be configured to have a control function only for speed control to accelerate a moving body from a stopped state to a given speed. The motor control device may also be configured to have a control function only for position control under operation condition of monotonically increasing the speed. "Monotonically increasing the speed" herein means increasing the speed without up-and-down variation.

Configuration of Motor Control Device

Figure 1:
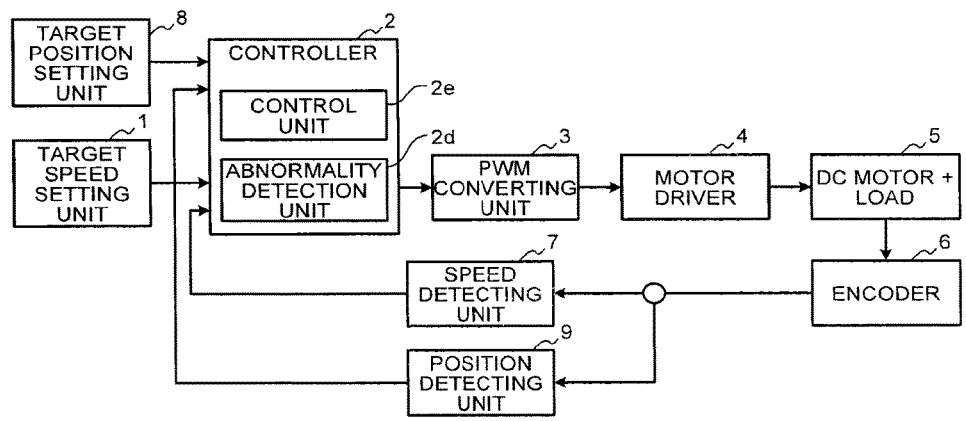
FIG. 1 is a diagram illustrating a configuration of a motor control device according to an embodiment.

FIG. 1 is a diagram illustrating a configuration of a motor control device according to an embodiment. The motor control device illustrated in FIG. 1 is an example in a case where a DC motor is used as a driving source of a device for conveying a paper medium such as a recording paper and a document handled in equipment such as a copying machine, a scanner device, a facsimile device, and a printer device. Arrows between components in FIG. 1 indicate information (data) flow or an operational relationship (relationship of causal connection).

The motor control device of this embodiment essentially includes: a target position setting unit 8; a target speed setting unit 1; a controller 2; a PWM converting unit 3; a motor driver 4; a DC motor+load 5; an encoder 6; and a speed detecting unit 7; and a position detecting unit 9 as illustrated in FIG. 1.

The motor control device controls to convey a paper medium at a target speed as a control target and to position the paper medium using the DC motor as a driving source. Therefore, the motor control device controls the motor driver 4 that drives the DC motor as a control target in a system including: the controller 2, the PWM converting unit 3; the target speed setting unit 1, and the target position setting unit 8. The target speed setting unit 1 sets the target speed as a control target value to the controller 2 by a user input operation before control operation. The target position setting unit 8 sets a target position as a control target value to the controller 2 by a user input operation before control operation.

In addition, the motor control device forms a feedback loop to the controller 2, the feedback loop including: the encoder 6; the speed detecting unit 7; and the position detecting unit 9. The encoder 6 is attached to the rotating shaft of the DC motor, and is configured to detect rotation. As the encoder 6, an encoder that detects light acting slits arranged at equal intervals in a circumferential direction of a disc using a sensor and converts rotation to an encoder signal including a time series pulse train (the rotation speed is detected as a pulse frequency) may be used, for example.

Figure 2:
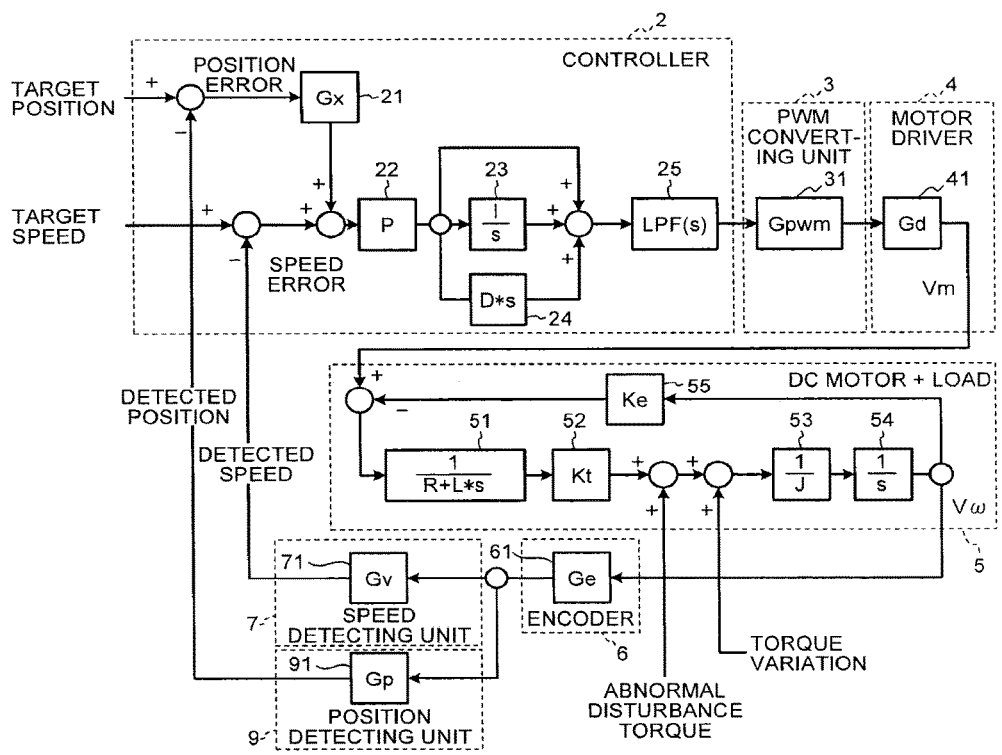
FIG. 2 is a motor feedback control system in the motor control device according to the embodiment in functional blocks.

Note that the DC motor drives a means for conveying a paper medium such as a recording paper and a document, and thus an operating state upon conveying operation under load, i.e. the movement of the rotation (output) shaft of the "DC motor+load 5" as illustrated in FIG. 2 is the target to be detected by the encoder 6 and output as an encoder (rotation detection) signal.

The speed detecting unit 7 detects the rotation speed of the DC motor from the encoder signal output from the encoder 6. In addition, the position detecting unit 9 detects the rotation position of the DC motor from the encoder signal output from the encoder 6. Each of the rotation speed and the rotation position detected here corresponds to a rotation detection value. The rotation speed detected by the speed detecting unit 7 is hereinafter referred to as a detected speed, and the rotation position detected by the position detecting unit 9 is hereinafter referred to as a detected position.

The controller 2 includes a control unit 2e and an abnormality detection unit 2d as illustrated in FIG. 1. The control unit 2e serves as a drive control unit, and performs a drive control to rotate the DC motor+load 5 at a control target value increasing with time based on the detected speed from the speed detecting unit 7, and the detected position from the position detecting unit 9. Specifically, the control unit 2e uses a difference of the detected speed of the DC motor obtained from a difference between the target speed set by the target speed setting unit 1 and the detected speed detected by the speed detecting unit 7 coupled with a difference between the target position set by the target position setting unit 8 and the detected position detected by the position detecting unit 9. From the difference of the detected speed, the control unit 2e performs PID (P: proportion, I: Integration, D: Differentiation) calculation, low pass filter calculation, and the like so as to calculate a control amount. The detail of this control unit 2e will be described later using FIG. 2.

In addition, the controller 2 includes the abnormality detection unit 2d. The abnormality detection unit 2d obtains an error of the detection results of the speed detecting unit 7 and the position detecting unit 9 with respect to the control target values, and from the obtained errors, it detects an abnormality of the control operation. Alternatively, the abnormality detection unit 2d may detect an abnormality of the control operation position using the detected position from the position detecting unit 9. The control unit 2e of the controller 2 controls to stop driving of the DC motor if the abnormality detection unit 2d detects an abnormality of the control operation. The detail of this abnormality detection process will be described later.

The PWM converting unit 3 receives input of digital data representing a control amount calculated by the controller 2, and converts the digital data to a PWM (Pulse Width Modulation) signal having a duty proportional to the control amount. The motor driver 4 drives the DC motor by applying to the DC motor a voltage proportional to the duty of the PWM signal output from the PWM converting unit 3.

The DC motor is controlled by the motor control device including the components illustrated in FIG. 1 to rotate at the target speed set by the target speed setting unit 1, whereby driving the means for conveying a paper medium (not shown) such as a recording paper and a document so as to move the paper medium to the target position set by the target position setting unit 8.

An additional description of the feedback control system of the motor control device (FIG. 1) is now provided. FIG. 2 is a diagram illustrating the DC motor feedback control system in the motor control device of FIG. 1 in functional blocks. FIG. 2 is a diagram expressing the functions of the respective components as their transfer characteristics in association with the components illustrated in FIG. 1. Note that, FIG. 2 illustrates, as a basic configuration of the control system, a configuration during normal operation in which the DC motor is controlled according to the set condition by the feedback control function. In FIG. 2, blocks in the controller 2 represent a configuration of the control unit 2e.

Since the control unit 2e of the controller 2 performs the feedback control using PID operation, it performs a PID calculation, a low pass filter calculation, and the like. Therefore, as illustrated in FIG. 2, the control unit 2e of the controller 2 calculates a difference between the target position set by the target position setting unit 8 and the rotation position (detected position by a Gp module 91 of the position detecting unit 9) of the DC motor as a control target, multiplies the difference by a Gx (position feedback gain) at a Gx module 21, and adds the multiplication result to a difference between the target speed set by the target speed setting unit 1 and the rotation speed (detected speed by a Gv module 71 of the speed detecting unit 7) of the DC motor as a control target.

The control unit 2e of the controller 2 multiplies the calculated difference by P (proportional gain) at a P module 22, multiplies the resultant by I (Integration gain)/s (Laplace operator) at an I/s module 23 and by D (Differentiation gain)*s at a D*s module 24 respectively, and adds respective calculation results of the P module 22, the I/s module 23, and the D*s module 24, as PID calculation.

In addition, the control unit 2e of the controller 2 multiplies the calculation result of the PID calculation by LPF(s) (low pass filter) at an LPF(s) module 25 so as to obtain a control amount.

The PWM converting unit 3 multiplies the control amount [lsb], which has been calculated by the controller 2, by a Gpwm [%/lsb] gain for converting the control amount to a duty [%] of the PWM signal at a Gpwm module 31. The motor driver 4 multiplies the duty of the PWM signal output from the PWM converting unit 3 by a Gd [V/%] gain for converting the duty to a voltage Vm to be applied to the DC motor at a Gd module 41.

The DC motor+load 5, to which the voltage Vm is applied from the motor driver 4, can be represented as a system having a module configuration including: a 1/(R+L*s) module 51; a Kt module 52; addition of an abnormal disturbance torque; torque variation; a 1/J module 53; and a 1/s module 54 in order from the voltage Vm input side to the rotation output Vw side, and further including a Ke module 55 on a loop for feeding back the rotation output Vω. The parameters of the DC motor+load 5 in the above module configuration are provided below.

R: Inter-terminal resistance
L: motor coil inductance
Kt: torque constant
J: motor inertia+load inertia
s: Laplace operator
Ke: inductive voltage constant The encoder 6, which receives the rotation output Vo of the DC motor and outputs the encoder (rotation detection) signal, calculates a Ge [Hz/(rad/s)] gain for converting a pulse number generated while the rotating shaft of the DC motor rotates one revolution to a value obtained by dividing the pulse number by 2π at a Ge module 61.

When a method of detecting a frequency by counting a pulse period of an encoder pulse by a high-speed clock fc [Hz] is used at the Gv module 71, for example, an encoder pulse frequency can be calculated by dividing the high-speed clock fc [Hz] by the count value. Therefore, the speed detecting unit 7, which receives the rotation detection signal from the encoder 6, converts the pulse period of the encoder pulse to a detected speed by calculation using a Gv [lsb/Hz] gain at a Gv module 71.

The position detecting unit 9, which receives the rotation detection signal from the encoder 6, converts the rotation detection signal to the rotation position (detected position) by multiplying the count value of the encoder pulse by a Gp [lsb·rad] gain at the Gp module 91.

A computer used as the controller 2, which is not illustrated, may be configured with a general-purpose hardware. More specifically, in the computer, a central processing unit (CPU) for executing instructions in software programs; a read only memory (ROM) for storing programs, data, and the like used by the CPU; a random access memory (RAM) for temporarily storing data generated by the programs and the like; and a hard disk drive (HDD) for storing data required to be stored such as various setting data set to the controller 2 and management information in a non-volatile manner are respectively connected by buses, and the buses have interfaces for respectively connecting an I/O port, a display unit, and an input unit.

The I/O port of the computer, which is used, is used as an input port for detected speed data calculated at the speed detecting unit 7 based on the rotation detection signal from the encoder 6 and detected position data calculated at the position detecting unit 9. The display unit and the input unit of this computer display a screen for guiding input operation of a user, and receive input of instructions and data regarding to settings made by button (key) operations of a user performed using a mouse and the like following the guide displayed on the screen, as the target position setting unit 8 and the target speed setting unit 1.

By connecting a device for reading/writing various disc-shaped media such as a compact disc (CD) or a small flash memory to the I/O port, various removable recording media can be used.

Abnormality Detection Process

If an abnormality that the rotation detection signal is not output from the encoder 6 due to disconnection, for example occurs during control of increasing the rotation speed of the DC motor with time such as acceleration from a stopped state by the motor control device described referring to FIGS. 1 and 2, the controller 2 controls in such a manner that the DC motor is at a predetermined target speed, that is, the difference is eliminated. However, since the target speed increases monotonically in an acceleration operation, the difference may increase so as to continuously increase current flowing into the DC motor and then runaway of the DC motor is caused. Thus, there is a possibility of breakage of parts due to runaway of a mechanical system that is driven, and of damage due to motor heating. Such an accident may also occur in a case where the rotation detection signal is not normally output from the encoder 6 due to a circuit malfunction and the like other than disconnection.

Therefore, the motor control device detects an abnormality occurring in the rotation detection signal from the encoder 6, and performs a stop control on the DC motor as a control target when an abnormality is detected, thereby preventing a damage and the like due to an abnormal operation of the DC motor from occurring.

An abnormality occurring in the rotation detection signal may be detected by either of the following two detection methods. In an acceleration operation of the DC motor as a control target, the control target value monotonically increases with respect to the elapsed time as time passes.

Therefore, in a first abnormality detection method, a threshold processing for comparing the rotation detection value obtained based on the rotation detection (encoder) signal of the DC motor at the time when a predetermined time period has elapsed with a predetermined first threshold is performed, and an abnormality is detected according to this comparison result (referred to as "detection method 1" hereinafter). In a normal operation, the rotation detection value should increase. Therefore, for this detection method 1, the first threshold is set to be a value that is supposed to be exceeded by the rotation detection value at the time when the predetermined time period has elapsed, and if the rotation detection value at the time when the predetermined time period has elapsed is smaller than or equal to this first threshold, it is determined that an abnormality occurs and the determination is set as a detection result.

In an acceleration operation of the DC motor as a control target, the control target value monotonically increases with respect to the elapsed time as time passes (i.e. can be determined uniquely). Therefore, in a second abnormality detection method, an error of the rotation detection value obtained based on the rotation detection (encoder) signal of the DC motor at the time when a predetermined time period has elapsed with respect to the control target value at the time (corresponding to a difference of the feedback control) is calculated, threshold processing for comparing the calculated error with a predetermined second threshold is performed, and an abnormality is detected based on this comparison result (referred to as "detection method 2" hereinafter). In a normal operation, the rotation detection value should increase and the error with respect to the control target value should fall in a small value. Therefore, for this detection method 2, the second threshold is set to be a value that is not supposed to be exceeded by the error, and if the error at the time when the predetermined time period has elapsed exceeds this second threshold, it is determined that an abnormality occurs and the determination is set as a detection result (refer to the description of FIG. 5 below).

Figure 3:
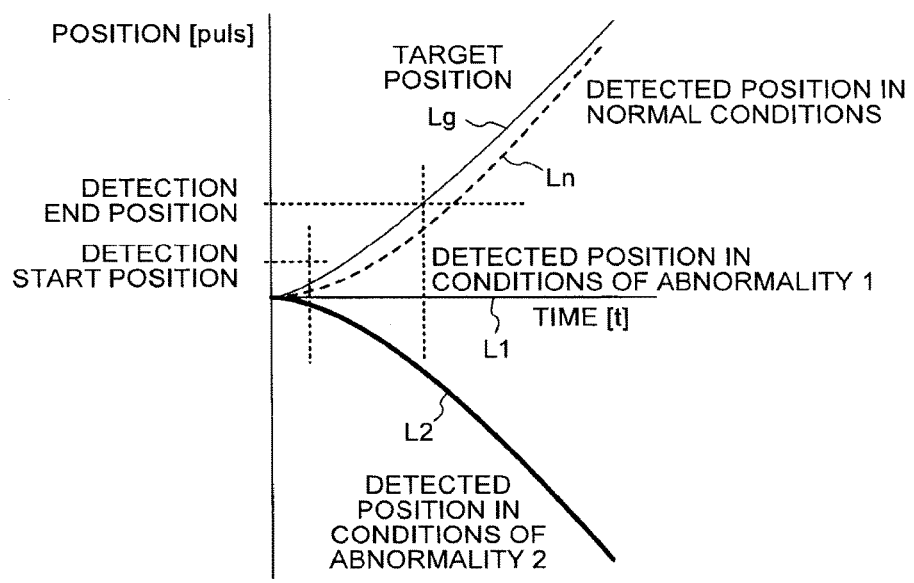
FIG. 3 is a graph illustrating a control target position that is a function of time and detected positions of an encoder both in abnormal conditions and in normal conditions in contrast.

These abnormality detection methods are described in more detail with concrete examples. FIG. 3 is a graph illustrating a control target position that is a function of time and detected positions of the encoder both in abnormal conditions and in normal conditions in contrast. In FIG. 3, the longitudinal axis represents a rotation position of the DC motor and defined by a detected position [puls] obtained based on a rotation detection signal from the encoder 6 (note that the line Lg illustrating a target position does not represent a detected value), and the horizontal axis represents time [t] that is an elapsed time from the time point when the control operation is started, which is set as t=0.

FIG. 3 illustrates detection values as time passes from the control start time both in abnormal conditions and in normal conditions in a control operation of simply increasing a target position as a control target value (illustrated example is a constant acceleration operation).

The motor control device is intended to perform detection operations for abnormalities of different causes. In FIG. 3, respective detection values are illustrated as an abnormality 1 (first abnormality) and an abnormality 2 (second abnormality).

The abnormality 1 is a case where a rotation detection signal is not output from the encoder 6 due to disconnection, for example. On the other hand, the abnormality 2 is a case where a rotation detection signal indicating a direction opposite to the actual rotation is output from the encoder 6 due to a malfunction of the circuit, for example. In order to enable detection of rotation direction, a rotation detection (encoder) signal of two phases shifted by 90° (phase A and phase B) is output in this embodiment. If the phase A and the phase B are connected oppositely by a malfunction, for example, the rotation direction is determined to be opposite, and positive and negative of the displacement also become opposite, and thus it is unfortunately detected as an operation moving away from the target position.

In the graph of FIG. 3, in conditions that a rotation detection signal is normally output from the encoder 6, the control is performed in such a manner that the detected position detected by the position detecting unit 9 becomes the same as the target position once the DC motor control is started. Therefore, a line Ln representing a detected position in normal conditions represents a position slightly lower than but close to a line Lg representing a target position in FIG. 3.

On the other hand, in conditions of an abnormality 1, if a rotation detection (encoder) signal is not output due to disconnection, the detected position stays at zero and does not vary even if the DC motor rotates as represented by a line L1 representing a detected position in the conditions of the abnormality 1 in FIG. 3.

In the conditions of the abnormality 2, if a rotation detection (encoder) signal is of incorrect opposite rotation output, a detected position output from the position detecting unit 9 based on the incorrect opposite rotation output becomes a negative value as represented by a line L2 representing a detected position in the conditions of the abnormality 2 in FIG. 3.

As described above, in the conditions of the abnormality 1, as time [t] passes, a difference between the target position Lg and the line L1 representing a detected position in the conditions of the abnormality 1 illustrated in FIG. 3 increases as the target position Lg increases. Therefore, the controller 2 performs a control to rotate the DC motor at a high speed in order to quickly eliminate the difference.

In the conditions of the abnormality 2, a difference between the target position Lg and the line L2 representing a detected position in the conditions of the abnormality 2 illustrated in FIG. 3 rapidly increases when a position variation in the negative direction due to false detection represented by the line L2 is added to the increase of the target position Lg as time [t] passes. Therefore, the controller 2 performs a control to rotate the DC motor at a higher speed than in the conditions of the abnormality 1 in order to eliminate the rapidly increasing difference.

Which means that the motor control device performs an unintended control operation corresponding to a difference that is generated because of output of an incorrect rotation detection signal from the encoder 6 and that is impossible in normal conditions in the both conditions of the abnormality 1 and the abnormality 2, and the unintended control operation damages a DC motor driving system.

In order to prevent the above-described unintended control operation corresponding to the output abnormality of a rotation detection signal from occurring, the motor control device detects an abnormality by the above-described detection method 1 or 2 based on a rotation detection (encoder) signal of the DC motor at the time when a predetermined time period has elapsed in the acceleration operation.

More specifically, in the case of the detection method 1, the abnormality detection unit 2d detects occurrence of an abnormality with a condition that the rotation detection value is smaller than or equal to the first threshold for determining whether it is a normal value or not. In the case of the detection method 2, the abnormality detection unit 2d calculates an error of the rotation detection value with respect to the control target value, and detects occurrence of an abnormality with a condition that the calculated error is more than the second threshold for determining whether it is a value corresponding to occurrence of an abnormality.

As the first and second thresholds used to detect an abnormality, experiential values obtained by verifying conditions that safety can be secured in the driving system as a control target, and that an effect of the abnormality detection process on the primary motor control operation can be small are used.

The above-described abnormality detections corresponding to the abnormality 1 and the abnormality 2 are both performed by threshold processing of the position detection value obtained based on the rotation detection (encoder) signal or an error of the position detection value with respect to the control target value. Therefore, the abnormality detection unit 2d may be configured to perform abnormality detection each time when a rotation detection signal is sampled.

It should be noted that there are time periods when a detection result is not effectively used, or there is no point in obtaining a detection result. These time periods include: a time period corresponding to a dead time that is a certain time period from a start time of the acceleration control; and a time period which is after a normal operation is confirmed by an abnormality detection and thus in which it is thought that there is no point in obtaining a detection result within a time period for an acceleration control. The time periods are determined by points indicated as "detection start position" and "detection end position", respectively, in FIG. 3. A time period corresponding to the positions between the two points is a time period to perform an abnormality detection process, that is, a detection time period when abnormality detection is required.

In the motor control device, this time period when abnormality detection is required is applied only to detection of the abnormality 1, and detection function is basically always operated for the abnormality 2. This is because of the nature that the detection value varies less in abnormal conditions of the abnormality 1 (the detection value stays at zero due to disconnection).

Figure 4:
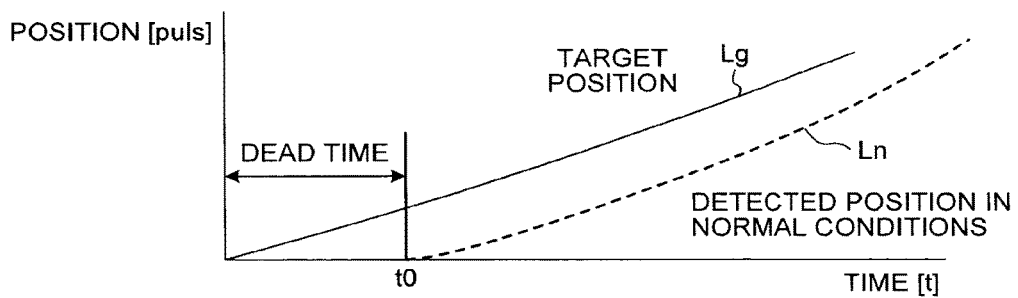
FIG. 4 is a graph to explain a dead time in a control operation by the motor control device according to the embodiment.

FIG. 4 is a graph to explain the dead time in the control operation by the motor control device. In FIG. 4, the longitudinal axis represents a rotation position of the DC motor (note that the line Lg represents the set target position and the line Ln represents a detected position), and the horizontal axis represents time [t] that is an elapsed time from the time point when the control operation is started, which is set as t=0, similarly to FIG. 3.

A control operation of simply increasing a target position as a control target value as time passes from the control start time as illustrated as a line Lg (illustrated example in FIG. 4 is a constant acceleration operation) is operated, and in this control operation, a detected position when a normal rotation detection (encoder) signal is output represented by a line Ln is illustrated in FIG. 4.

The time period from the start time of the control operation to a time point t0 in FIG. 4 is immediately after the start of the acceleration operation of the DC motor. In an operating state affected by static friction torque and the like in this time period, an output of a detected position from the position detecting unit 9 is delayed by a time length t0 from the operation start time. This time length corresponding to t0 is called dead time.

Therefore, an abnormality detection based on a detected position output from the position detecting unit 9 in this dead time t0 may lead to an incorrect detection result, and thus the detection result is not used. Therefore, the abnormality detection unit 2d starts abnormality detection after the dead time t0, which is a predetermined time, has elapsed.

The "detection end position" indicated in FIG. 3 defines a time point when a detected position output from the position detecting unit 9 is confirmed to be normal, and thus in a time period after the time point, it is much less likely that a detection result changes to abnormal. Therefore, it is beneficial to finish the process so as to reduce the process load. This operation is especially well-suited for detection of the abnormality 1, and is used in an abnormality detection process to be described later (refer to the flow of FIG. 5).

Abnormality Detection Process Flow

A procedure in the abnormality detection process performed by the controller 2 (abnormality detection unit 2d) of the motor control device will be described referring to a process flow chart of FIG. 5. In the flow chart of the abnormality detection process of FIG. 5, the abnormality detection unit 2d performs the detection process adapted to both of the different causes of abnormality including: the abnormality 1 (a case where a rotation detection signal is not output from the encoder 6 due to disconnection, for example); and the abnormality 2 (a case where a rotation detection signal in a direction opposite to the actual rotation is output from the encoder 6 due to a malfunction of the circuit, for example). In the flow chart illustrated in FIG. 5, the abnormality detection unit 2d detects an abnormality by the above-described detection method 2 (that is a method including: calculating an error of the rotation detection value with respect to the control target value; and detecting occurrence of an abnormality with a condition that the calculated error is more than the second threshold for determining whether it is a value corresponding to occurrence of an abnormality).

Figure 5:
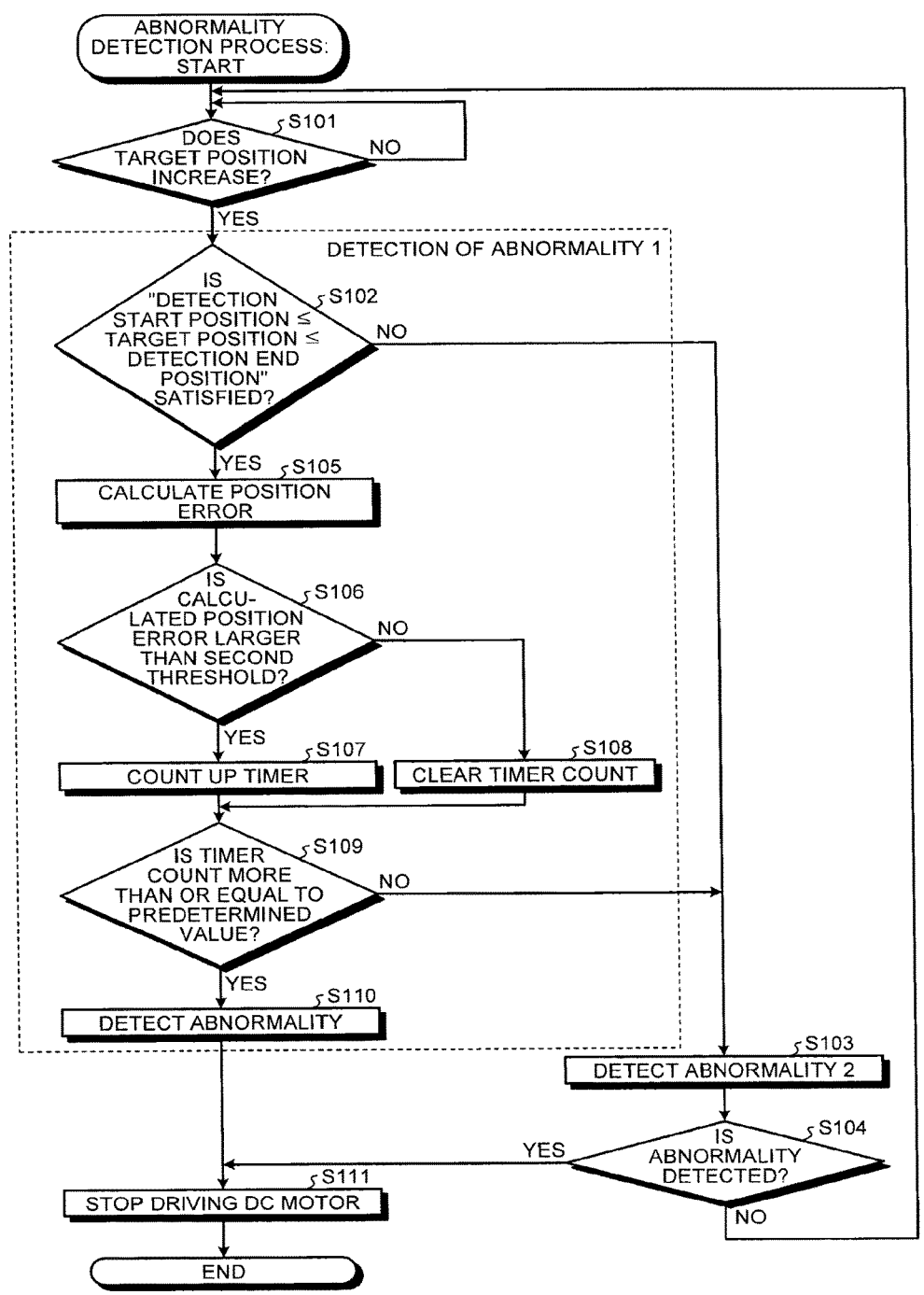
FIG. 5 is a flow chart illustrating a procedure of an abnormality detection process (detection method 2) according to the embodiment.

When the motor control device controls the DC motor in a stopped state, for example, as a control target, the abnormality detection unit 2d starts by activating the process flow chart of FIG. 5.

When the process according to the flow chart of FIG. 5 is started, the abnormality detection unit 2d firstly confirms that the started control that is started when the drive control of the DC motor is started is an acceleration operation if the target position set as the control target value increases (step S101: Yes). Note that although the abnormality detection unit 2d herein confirms that the acceleration operation is started from the stopped state based on the increase of the target position as time passes, the abnormality detection unit 2d may be configured to determine speed variation from the stopped state (or a constant-speed operating state) based on the target speed. In addition, if a high level controller for controlling the motor control device exists, and the operation is started according to a stop request, acceleration request, and the like from the high level controller, the abnormality detection unit 2d may determine based on these instructions.

Next, the abnormality detection unit 2d determines whether the target position increasing as time passes is more than or equal to a detection start position ("detection start position" in FIG. 3) and is smaller than or equal to the detection end position (step S102), and branches to the detection process of the abnormality 1 and the detection process of the abnormality 2 based on the determination result.

If the target position is more than or equal to the detection start position and smaller than or equal to the detection end position (step S102: Yes), the abnormality detection unit 2d performs steps S105 to S110 that are included in the detection process of the abnormality 1 (a procedure enclosed by a dashed line in FIG. 5), and if the target position is out of the above-described range (step S102: No), the abnormality detection unit 2d performs steps S103 and S104 that are included in the detection process of the abnormality 2. Since there exists a dead time immediately after acceleration in the DC motor operation due to an effect of static friction torque and the like, detection of the abnormality 1 immediately after the start of the acceleration that is likely to be incorrect detection can be avoided by starting the processing after the time length corresponding to the dead time. The reason for defining the time period to perform the detection process of the abnormality 1 is to prevent the likelihood of incorrect detection.

Note that since the target position used for the determination in step S102 varies its target value as a set value as time passes, the abnormality detection unit 2d may be configured to use time instead of target position in determination in step S102.

If the target position is in the range for performing the detection process of the abnormality 1 (step S102: Yes), a position error of the detected position calculated by the position detecting unit 9 with respect to the target position is calculated based on the rotation detection (encoder) signal (step S105).

Next, the abnormality detection unit 2d performs the threshold processing for determining whether the position error calculated in step the S105 is larger than the second threshold (step S106). Specifically, the abnormality detection unit 2d determines occurrence of the abnormality with a condition that the calculated position error is more than the second threshold for determining whether it is a value corresponding to occurrence of an abnormality.

Figure 6:
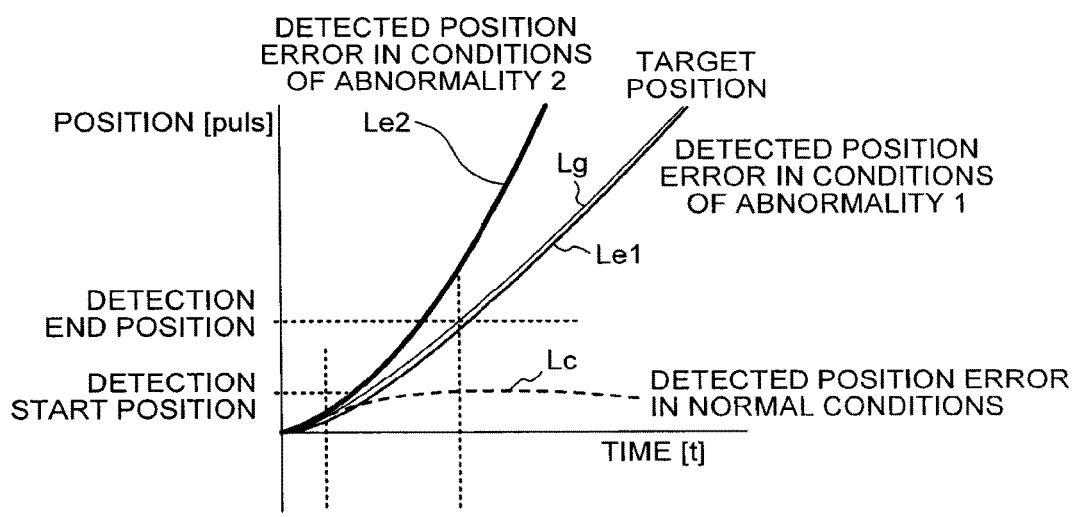
FIG. 6 is a graph illustrating the control target position that is a function of time, and position errors both in abnormal conditions and in normal conditions in contrast.

An explanation is now added with concrete examples for the method of detecting occurrence of an abnormality by the threshold processing with respect to a position error performed in step S106. FIG. 6 is a graph illustrating the control target position that is a function of time, and position errors both in abnormal conditions and in normal conditions.

The longitudinal axis in FIG. 6 represents a rotation position of the DC motor represented by the unit of the detected position [puls] obtained based on a rotation detection signal from the encoder 6, and the horizontal axis represents time [t] that is an elapsed time from the time point when the control operation is started, which is set as t=0.

FIG. 6 illustrates a position error (error of a position detection value with respect to the target value) value as time passes from the control start time both in the abnormal conditions 1 and 2 (refer to FIG. 3) and in normal conditions in a control operation of simply increasing a target position as a control target value (the illustrated example in FIG. 6 is a constant acceleration operation, and the line Lg representing a target position is a line rising increasing to the right).

The line Lc representing a position error value illustrated in FIG. 6 represents an error value in normal operation that is an almost constant small value after the dead time.

On the other hand, in the conditions of the abnormality 1, the detected position value stays at zero and does not vary, and thus the line Le1 representing the position error value is almost the same as the target position. In the conditions of the abnormality 2, a value of the detected position simply decreases (displaces in one direction), and thus the line Let representing the position error value rapidly increases comparing to the case of the abnormality 1.

Therefore, it is possible to discriminate whether the operation is in normal operating state or an abnormality has occurred by performing the threshold processing with a threshold that is set slightly larger than the error value (line Lc) in normal operation. In addition, regarding an occurrence detection of the abnormality 1 and the abnormality 2, discrimination is also possible by selecting the threshold.

In the process flow chart of FIG. 5, as a detection process adapted to the abnormality 1, a threshold appropriate to discriminate a normal operating state and the abnormality 1 is set in step S106. In addition, as a procedure of the detection process, when it is determined that an abnormality has occurred in the threshold processing of step S106, a loop process for running through a process of step S106 again is repeated, and with a condition that an occurrence of the abnormality continues for a predetermined time length, it is finally determined that the abnormality is an expected abnormality that requires to stop driving. The second threshold set in step S106 is a value smaller than a second threshold to be set appropriate to detection of the abnormality 2 in step S103 as is described later, and is adapted to both of the abnormality 1 and the abnormality 2.

Therefore, when it is determined that an abnormality has occurred because a position error is more than the second threshold in step S106 (step S106: Yes), the abnormality detection unit 2d counts up the timer, that is, it starts a timer count if a timer is stopped, and if a timer is already started, an operation to continue a timer count of the timer is performed (step S107).

On the other hand, if it is not determined that an abnormality occurs because the position error is smaller than or equal to the second threshold in step S106 (step S106: No), the abnormality detection unit 2d stops a timer count that is currently timing, and clears the count so as to start a new loop process (step S108).

After the operation of the timer count in step S107 or S108, the abnormality detection unit 2d confirms whether the current timer count is more than or equal to a predetermined value defined to determine an expected abnormality that requires to stop driving the DC motor (step S109).

If the timer count is not more than or equal to the predetermined value (step S109: No), the process returns to the first step S101 of the detection operation. However, on the way back to step S101, the abnormality detection unit 2d performs the detection process of the abnormality 2 (step S103) in steps S103 and S104.

On the other hand, if the timer count is more than or equal to the predetermined value (step S109: Yes), the abnormality detection unit 2d determines that an expected abnormality that requires to stop driving the DC motor has occurred (step S110), stops driving the DC motor (step S111), and ends the abnormality detection process.

In the detection process corresponding to the abnormality 2 of step S103, the abnormality detection is always performed basically. In this embodiment, if it is determined that the detection process of the abnormality 1 is not started (step S102: No) since the target position is out of the set range in step S102 for determining whether to start the detection process of the abnormality 1 or not by confirming whether the target position is in the set range or not, the abnormality detection unit 2d performs the detection process of the abnormality 2 (step S103).

In this embodiment, also when the timer count does not reach to the predetermined value in step S109 (step S109: No), the abnormality detection unit 2d performs the detection process of the abnormality 2 (step S103). This is because in the detection process adapted to the abnormality 1, the occurrence of the abnormality 1 that finally requires to stopping driving is detected with a condition of continuation for a predetermined time length. And on a way of a loop process performed as the process steps, that is, on a way back from step S109 to S101 in order to perform the detection process of the abnormality 1 again, the detecting process of the abnormality 2 is performed.

In the detection process of the abnormality 2 of step S103, the abnormality detection unit 2d calculates the position error similarly in steps S105 and S106, and performs the threshold processing with respect to the calculated position error. However, the second threshold appropriate for the detection of the abnormality 2 is set to be a larger value than the second threshold set in step S106 so as to adapt to the position error of the abnormality 2 that rapidly varies (refer to FIG. 6), whereby an abnormality to which the detection process of abnormality 1 is to be applied and an abnormality to which the abnormality 2 is to be applied can be discriminated. Therefore, it is then confirmed whether an abnormality has been detected in step S103 (step S104), and the process branches depending on the detection result of the abnormality 2.

If the abnormality detection is confirmed in step S104 (step S104: Yes), it means that the position error is large making a dangerous situation. Therefore, the abnormality detection unit 2d determines that an abnormality requiring to stop driving the DC motor has occurred without waiting for the detection result of the abnormality 1, stops driving the DC motor (step S111), and ends the abnormality detection process.

On the other hand, if the abnormality detection is not confirmed in step S104 (step S104: No), the process returns to the first step S101 of the detection operation of the abnormality 1.

As described above, by the abnormality detection process of this embodiment, an abnormality is reliably detected by respectively adapting to the abnormality 1 and the abnormality 2 of different causes, and the stop control of the DC motor is performed when an abnormality is detected, whereby a damage on the DC motor driving system (breakage of a mechanical system due to runaway thereof, damage due to motor heating, and the like) can be prevented from occurring.

In the abnormality detection process according to the embodiment described above, the abnormality detection process adapted to both of the abnormality 1 and the abnormality 2 of different causes is provided. However, a process for detecting either one can be realized by using a basically similar method.

In addition, although the detection method 2 (method based on the position error) is used in the abnormality detection process according to the embodiment described above, the detection method 1 (method based on the detected position) may be used instead of the method. When the detection method 1 is used, the threshold processing is different as described above. However, the detection process can be performed with a procedure similar to the process flow chart of FIG. 5 by replacing steps S105 and S106, and step S103 in the process flow chart of FIG. 5 with the threshold processing described above referring to FIG. 3. Such a process according to another embodiment is described in detail below.

Figure 7:
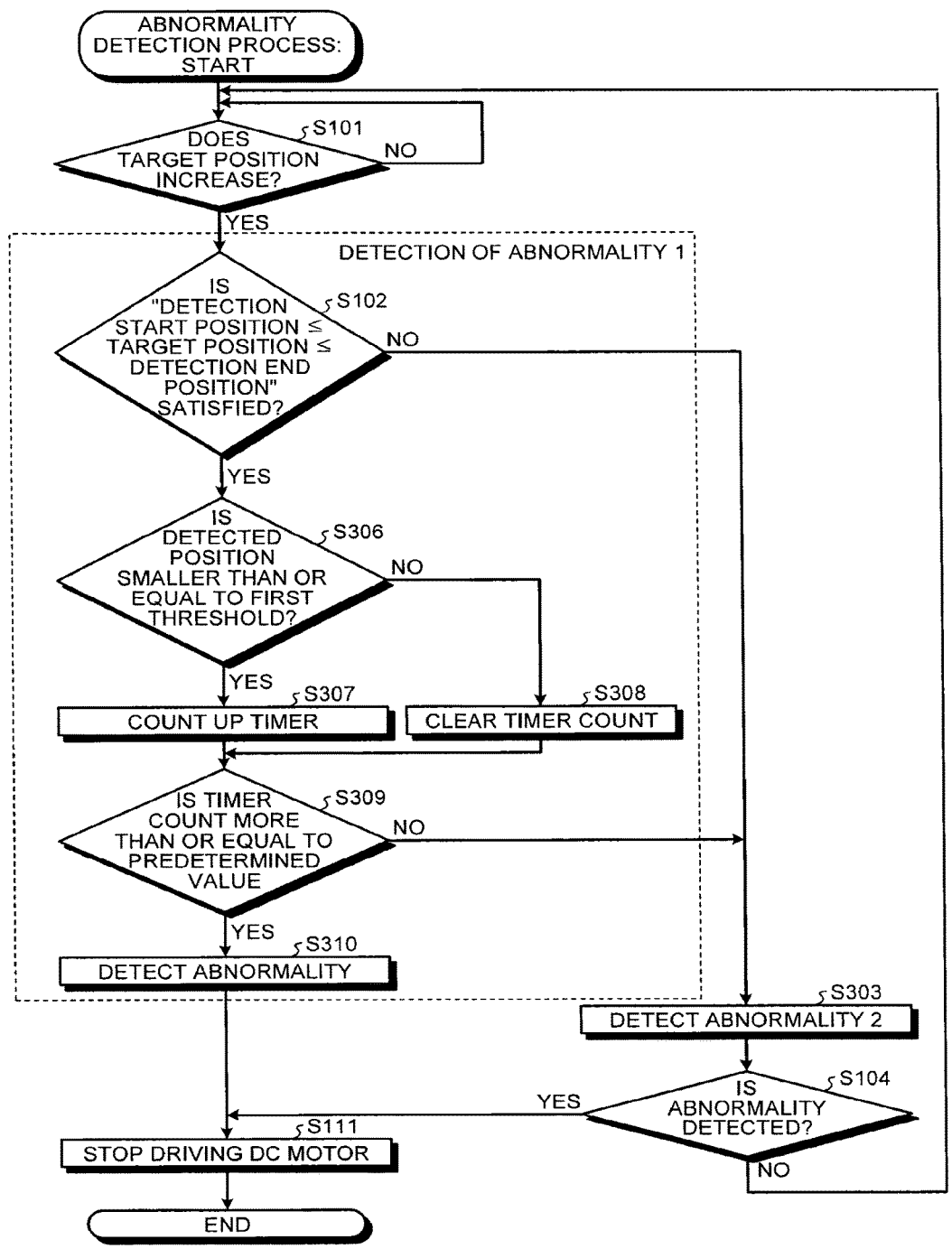
FIG. 7 is a flow chart illustrating a procedure of an abnormality detection process (detection method 1) according to the embodiment.

FIG. 7 is a flow chart illustrating a procedure of the abnormality detection process by the detection method 1. Steps S101 and S102 are similar to the procedure of the abnormality detection process by the detection method 1 described referring to FIG. 5. Next, in the detection method 1, the abnormality detection unit 2d performs the threshold processing for detecting whether the detected position output from the position detecting unit 9 is smaller than or equal to the first threshold (step S306). If the detected position is smaller than or equal to the first threshold (step S306: Yes), the abnormality detection unit 2d counts up a timer (step S307).

On the other hand, if the detected position is more than the first threshold in step S306 (step S306: No), the abnormality detection unit 2d clears the timer count (step S308).

Then, the abnormality detection unit 2d determines whether the timer count is more than or equal to the predetermined value (step S309). If the timer count is more than or equal to the predetermined value (step S309: Yes), the abnormality detection unit 2d determines an abnormality (step S310). On the other hand, if the timer count is smaller than the predetermined value in step S309 (step S309: No), the abnormality detection unit 2d detects the abnormality 2 (step S303). In this step, the detection of the abnormality 2 is performed similarly to that performed in step S306. The following process (step S104, S111) will be performed similarly to the process of the detection method 2.

In the embodiments described above, a position control is described as an example, but a speed control can also be performed using a similar detection method. The speed control may be for an acceleration operation from a stopped state (speed: zero), and may also be for an acceleration operation from a constant speed.

Note that a motor control program that is executed on a computer used as the controller 2 in the embodiments is previously stored in a ROM or the like and provided.

The motor control program executed in the computer used as the controller 2 according to the embodiments may be configured to be provided as a file in installable form or executable form that is stored in a computer-readable storage medium such as a CD-ROM, a flexible disk (FD), a CD-R, a DVD (Digital Versatile Disk).

In addition, the motor control program to be executed by the computer used as the controller 2 according to the embodiments may be configured to be stored in a computer connected a network such as the Internet and to be provided when it is downloaded through the network. Further, the motor control program to be executed on the computer used as the controller 2 according to the embodiments may be configured to be provided or distributed through a network such as the Internet.

The motor control program to be executed on the computer used as the controller 2 according to the embodiments has a module configuration including each of the above-described units (control unit 2e, abnormality detection unit 2d). As an actual hardware, a CPU reads the motor control program from the ROM and executes the program, whereby the each unit is loaded on a main memory so that the control unit 2e and the abnormality detection unit 2d are generated on the main memory.

The control unit 2e and the abnormality detection unit 2d may be configured by software as well as hardware.

According to the embodiments, an abnormality occurring upon a drive control for increasing rotation of a motor with time is detected, and the present invention has an effect that a damage of a motor driving system due to an abnormality such as breakage of a mechanical system due to runaway thereof, and a damage due to motor heating can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control device comprising:
an encoder configured to detect rotation of a motor to be controlled and output a rotation detection signal related to the rotation;
a drive control circuit configured to perform drive control to rotate the motor at a control target value increasing with time based on a rotation detection value calculated from the rotation detection signal; and
an abnormality detection circuit configured to when a target position of the motor is changed, begin performing a first abnormality detection process for detecting a first abnormality related to output of the encoder and performing a second abnormality detection process for detecting a second abnormality related to the rotation of the motor,
wherein the abnormality detection circuit
performs the first abnormality detection process for only a predetermined time period defined either by time elapsed from start of the drive control or by predetermined control target values,
continues performance of the second abnormality detection process for a time period following the predetermined time period,
performs the first abnormality detection process at least based on the rotation detection value and a first threshold,
performs the second abnormality detection process at least based on an error between the rotation detection value and a target control value and a second threshold,
performs the second abnormality detection process by comparing an error between the control target value and the rotation detection value with the second threshold until the target position reaches a first position from start of the drive control,
performs the first abnormality detection process by comparing the rotation detection value with the first threshold until the target position reaches a second position from the first position, and
performs the second abnormality detection process by comparing the error with the second threshold after the target position reaches the second position, and
wherein the drive control circuit performs control to stop rotation of the motor when the first abnormality or the second abnormality is detected.

2. The motor control device according to claim 1, wherein the abnormality detection circuit detects the first abnormality when a count of how many times the rotation detection value is smaller than the first threshold continuously is a predetermined value in the first abnormality detection process, and detects the second abnormality when the rotation detection value is smaller than the second threshold in the second abnormality detection process.

3. The motor control device according to claim 1, wherein the abnormality detection circuit always performs the second abnormality detection process after the drive control is started.

4. The motor control device according to claim 1, wherein the predetermined time period is a period to when a target position reaches a predetermined position.

5. The motor control device according to claim 1, wherein the abnormality detection circuit performs the first abnormality detection process and the second abnormality detection process when the target position increases.

6. The motor control device according to claim wherein the abnormality detection circuit performs the second abnormality detection process after the first abnormality detection process in the predetermined time period, and
the drive control circuit performs control to stop rotation of the motor without performing the second abnormality detection process when the first abnormality is detected.

7. An image formation device, comprising:
a motor that conveys a recording medium on which an image is formed; and
a motor control device including
an encoder configured to detect rotation of the motor to be controlled and output a rotation detection signal related to the rotation;
a drive control circuit configured to perform drive control to rotate the motor at a control target value increasing with time based on a rotation detection value calculated from the rotation detection signal; and
an abnormality detection circuit configured to when a target position of the motor is changed, begin performing a first abnormality detection process for detecting a first abnormality related to output of the encoder and performing a second abnormality detection process for detecting a second abnormality related to the rotation of the motor,
wherein the abnormality detection circuit
performs the first abnormality detection process for only a predetermined time period defined either by time elapsed from start of the drive control or by predetermined control target values,
continues performance of the second abnormality detection process for a time period following the predetermined time period,
performs the first abnormality detection process at least based on the rotation detection value and a first threshold,
performs the second abnormality detection process at least based on an error between the rotation detection value and a target control value and a second threshold,
performs the second abnormality detection process by comparing an error between the control target value and the rotation detection value with the second threshold until the target position reaches a first position from start of the drive control,
performs the first abnormality detection process by comparing the rotation detection value with the first threshold until the target position reaches a second position from the first position, and
performs the second abnormality detection process by comparing the error with the second threshold after the target position reaches the second position, and
wherein the drive control circuit performs control to stop rotation of the motor when the first abnormality or the second abnormality is detected.

8. A conveying device, comprising:
a motor that conveys a paper medium to a target position; and
a motor control device including
an encoder configured to detect rotation of the motor to be controlled and output a rotation detection signal related to the rotation;
a drive control circuit configured to perform drive control to rotate the motor at a control target value increasing with time based on a rotation detection value calculated from the rotation detection signal; and an abnormality detection circuit configured to when the target position of the motor is changed, begin performing a first abnormality detection process for detecting a first abnormality related to output of the encoder and performing a second abnormality detection process for detecting a second abnormality related to the rotation of the motor, wherein the abnormality detection circuit performs the first abnormality detection process for only a predetermined time period defined either by time elapsed from start of the drive control or by predetermined control target values, continues performance of the second abnormality detection process for a time period following the predetermined time period, performs the first abnormality detection process at least based on the rotation detection value and a first threshold, performs the second abnormality detection process at least based on an error between the rotation detection value and a target control value and a second threshold, performs the second abnormality detection process by comparing an error between the control target value and the rotation detection value with the second threshold until the target position reaches a first position from start of the drive control, performs the first abnormality detection process by comparing the rotation detection value with the first threshold until the target position reaches a second position from the first position, and performs the second abnormality detection process by comparing the error with the second threshold after the target position reaches the second position, and wherein the drive control circuit performs control to stop rotation of the motor when the first abnormality or the second abnormality is detected.

9. A motor control method comprising:

detecting rotation of a motor to be controlled;

outputting a rotation detection signal related to the rotation;

performing drive control to rotate the motor at a control target value increasing with time based on a rotation detection value calculated from the rotation detection signal;

when a target position of the motor is changed, beginning performing a first abnormality detection process for detecting a first abnormality related to output of the encoder and performing a second abnormality detection process for detecting a second abnormality related to the rotation of the motor, performing the first abnormality detection process for only a predetermined time period defined either by time elapsed from start of the drive control or by predetermined control target values;

continuing performance of the second abnormality detection process for a time period following the predetermined time period; performing the first abnormality detection process at least based on the rotation detection value and a first threshold;

performing the second abnormality detection process at least based on an error between the rotation detection value and a target control value and a second threshold;

performing the second abnormality detection process by comparing an error between the control target value and the rotation detection value with the second threshold until the target position reaches a first position from start of the drive control;

performing the first abnormality detection process by comparing the rotation detection value with the first threshold until the target position reaches a second position from the first position;

performing the second abnormality detection process by comparing the error with the second threshold after the target position reaches the second position; and performing control to stop rotation of the motor when the first abnormality or the second abnormality is detected.

10. The motor control method according to claim 9, further comprising:

detecting the first abnormality when a count of how many times the rotation detection value is smaller than the first threshold continuously is a predetermined value in the first abnormality detection process; and detecting the second abnormality when the rotation detection value is smaller than the second threshold in the second abnormality detection process.

11. The motor control method according to claim 9, wherein the second abnormality detection process is always performed after the drive control is started.

12. The motor control method according to claim 9, wherein the predetermined time period is a period to when a target position reaches a predetermined position.

13. The motor control method according to claim 9, wherein the first abnormality detection process and the second abnormality detection process are performed when the target position increases.

14. The motor control method according to claim 9, wherein the second abnormality detection process is performed after the first abnormality detection process in the predetermined time period, and the control to stop the rotation of the motor is performed without performing the second abnormality detection process when the first abnormality is detected.

* * * * *